United States Patent [19]

Hardwick et al.

[11] Patent Number: 5,737,141
[45] Date of Patent: Apr. 7, 1998

[54] RETRIEVING DATA RECORDED AT DIFFERENT BIT DENSITIES

[75] Inventors: John Patrick Hardwick, Bristol, England; Christopher Huw Williams, Chepstow, United Kingdom

[73] Assignee: Hewlett-Packard Company, Palo Alto, Calif.

[21] Appl. No.: 646,241

[22] PCT Filed: Dec. 5, 1994

[86] PCT No.: PCT/GB94/02664

§ 371 Date: Aug. 19, 1996

§ 102(e) Date: Aug. 19, 1996

[87] PCT Pub. No.: WO95/15551

PCT Pub. Date: Jun. 8, 1995

[30] Foreign Application Priority Data

Dec. 4, 1993 [GB] United Kingdom .................. 9324918

[51] Int. Cl.$^6$ ........................................................ G11B 5/09
[52] U.S. Cl. .................. 360/45; 360/46; 360/48; 360/65; 360/67; 360/61
[58] Field of Search ........................ 360/8, 61, 64, 360/48, 119, 46, 67, 65

[56] References Cited

U.S. PATENT DOCUMENTS

| | | | |
|---|---|---|---|
| 4,888,779 | 12/1989 | Karabed | 371/43 |
| 5,255,128 | 10/1993 | Inoue et al. | 360/51 X |
| 5,257,272 | 10/1993 | Fredrickson | 360/40 X |
| 5,258,933 | 11/1993 | Johnson et al. | 364/724.01 |
| 5,367,410 | 11/1994 | McCarthy | 360/48 |
| 5,550,683 | 8/1996 | Koren | 360/46 |
| 5,615,055 | 3/1997 | Takuda et al. | 360/8 |

OTHER PUBLICATIONS

Forney, David G., Jr., "The Viterbi Algorithm," *Proceedings of the IEEE*, Mar. 1973, p. 268–278.

IEEE Global Telecommunications Conference, vol. 3, 2 Dec. 1993, J. Fitzpatrick and J.K. Wolf "Partial Response Class I Signaling Applied to High Density Magnetic Recording".

Database WPI, Section EI, Week 9142, Derwent Publications Ltd., 16 Jan.1991.

Patent Abstracts of Japan vol. 18, No. 117, 24 Feb.1994 and JP,A, 05 303 838, 16 Nov.1993.

Patent Abstracts of Japan vol. 17, No. 681, 14 Dec. 1993 and JP,A, 05 225 638, 3 Sep. 1993.

Patent Abstracts of Japan vol. 17, No. 408, 29 Jul.1993 and JP,A, 05 073 924, 26 Mar. 1993.

8th International Conference on Video, Audio and Data Recording 26 Apr. 26, 1990, University of Birmingham, UK.

*Primary Examiner*—Aristotelis M. Psitos
*Assistant Examiner*—Alan Faber

[57] ABSTRACT

A Digital Data Storage (DDS) data storage mechanism for reading DDS tapes containing data at either 61 kbpi or 122 kbpi has two circuits for recovering data from signals induced in a magnetic head by magnetic patterns on the tape. One circuit incorporates a clipping amplifier, a phase-locked loop (PLL), and a latch to sample the two-level signal obtained at 61 kbpi, at times defined by clock pulses from the PLL. The second circuit incorporates a PR-1 partial-response maximum-likelihood (PRML) detector to decode the three-level signal obtained at 122 kbpi. The cosine frequency response characteristic of the PR-1 channel facilitates use of the same rotary head drum and magnetic head gap for reading tapes at either bit density.

8 Claims, 3 Drawing Sheets

RETRIEVING DATA RECORDED AT DIFFERENT BIT DENSITIES

TECHNICAL FIELD

This invention relates to methods and apparatus for retrieving digital signals which have been recorded on a recording medium at more than one bit density, and particularly, though not exclusively, to methods and apparatus for retrieving data stored using a DDS data storage system.

BACKGROUND ART

It is already known to provide reliable storage and retrieval of large volumes of digital data, such as computer data, in particular by means of the DDS (Digital Data Storage) format defined in ISO/IEC Standard 10777:1991 E.

In a DDS read/write mechanism using the format defined in that Standard data are recorded on an elongate recording media, comprising tape coated with a magnetic medium, by a rotating drum carrying one or more electromagnetic heads. The tape is moved by a motor-driven capstan along a path extending between two spools or reels and wrapped partially around the drum. The plane of rotation of the drum is disposed at an angle to the plane of movement of the tape, so that each head traverses the tape along successive tracks extending across the width of the tape at an angle to its centreline. The mechanism includes appropriate circuitry for encoding data into signals suitable for recording on tape, including error detection and correction codes, and for conditioning those signals into a form which is optimally matched to the characteristics of the recording media; for data retrieval, additional circuitry is provided for detecting magnetic field variations stored on the tape, deriving corresponding signals, conditioning those signals into a form suitable for subsequent processing, decoding the encoded data, and detecting and correcting errors.

Data are recorded at a bit density of approximately 61 kilobits per inch (kbpi) (equivalent to approximately 24 kilobits per centimetre). At this bit density a typical DDS tape cartridge can currently store up to approximately eight gigabytes of data, using the longest practicable tape and techniques such as data compression to maximize the quantity of data the tape can accommodate.

With the steady increase in use of computer equipment and the volumes of data processed and stored by such equipment, it has become desirable to increase the capacity of a DDS tape cartridge still further. One possible approach is to increase the bit density of data stored on the tape. However, it is essential that any DDS mechanism which provides a higher capacity in this manner should also be capable of reading and writing DDS tapes which conform to the existing 61 kbpi Standard, to ensure compatibility with existing DDS mechanisms already in use.

In principle it would be expected that changing the bit density of data stored on a magnetic tape would entail corresponding changes in operating parameters throughout the DDS mechanism, e.g. in the electromagnetic heads, signal conditioning circuitry and magnetic field detection circuitry. On this basis it would appear that, to provide compatibility with 61 kbpi mechanisms, a mechanism using a higher bit density would have to incorporate two sets of much of its circuitry and possibly even of its head drum, one set for 61 kbpi operation and the other for operation at a higher density. Such a solution would clearly be very expensive and awkward to design and manufacture.

DISCLOSURE OF INVENTION

The applicant has discovered that, unexpectedly, it is possible by use of particular component parameters and decoding circuitry to provide a DDS mechanism which can read and write DDS tapes which conform to the present 61 kbpi Standard and can also, using to a large extent the same circuitry and in particular the same head drum, read and write data at the very much higher bit density of 122 kbpi. Thus the invention provides both a significant increase in bit density, and an economical way of maintaining compatibility with existing DDS equipment.

According to one aspect of this invention there is provided a method for retrieving data from a magnetic medium, comprising the steps of:

deriving signals corresponding to magnetic field patterns stored on the magnetic medium; and decoding said signals to retrieve data represented thereby, using a PR-1 partial-response maximum-likelihood decoding operation.

According to another aspect of this invention there is provided apparatus for retrieving data from a magnetic medium, comprising:

means for deriving signals corresponding to magnetic field patterns stored on the magnetic medium; and a PR-1 partial-response maximum-likelihood decoder for decoding said signals to retrieve data represented thereby.

According to further aspect of this invention there is provided a method for retrieving data from a magnetic medium, said data being stored at a first or a second bit density on said medium, said second density being higher than said first density, comprising the steps of:

deriving signals corresponding to magnetic field patterns stored on the magnetic medium, by means of a gapped magnetic head, said head being used to derive signals for data stored at either said first or said second density;

decoding said signals using a first decoder for data stored at said first density, to retrieve data represented by said signals;

decoding said signals using a second decoder for data stored at said second density, to retrieve data represented by said signals, said second decoder incorporating a PR-1 partial-response maximum-likelihood decoding operation; and selecting said first or said second decoder for use in accordance with the bit density of data stored on said medium.

According to another aspect of this invention there is provided apparatus for retrieving data from a magnetic medium, said data being stored at a first or a second bit density on said medium, said second density being higher than said first density, comprising:

means including a gapped magnetic head for deriving signals corresponding to magnetic field patterns stored on the magnetic medium, said head being used to derive signals for data stored at either said first or said second density;

a first decoder for decoding said signals for data stored at said first density, to retrieve data represented by said signals;

a second decoder for decoding said signals for data stored at said second density, to retrieve data represented by said signals, said second decoder incorporating a PR-1 partial-response maximum-likelihood decoding operation; and means for selecting said first or said second decoder for use in accordance with the bit density of data stored on said medium.

Although it is known to use partial-response maximum-likelihood (PRML) decoding in connection with magnetic recording media (see for example U.S. Pat. No. 5,258,933), it has hitherto been considered that the appropriate type of PRML decoding for this purpose is that known as class IV, or PR-4. It has not been previously recognized that the use of a PR-1 (or duobinary) partial-response system, characterized by the polynomial (1+D) where D represents a one bit delay, enables an elegant and cost-effective solution to be provided to the problem of retrieving data from tapes at either of two different bit densities.

BRIEF DESCRIPTION OF DRAWINGS

Methods and apparatus for retrieving data from a magnetic medium in accordance with this invention will now be described, by way of example, with reference to the accompanying drawings, in which.

BEST MODE FOR CARRYING OUT THE INVENTION, & INDUSTRIAL APPLICABILITY

The data storage apparatus now to be described utilizes a helical scan technique for storing data in oblique tracks on a recording tape in a format similar to that used for the storage of PCM audio data according to the DAT Conference Standard (June 1987, Electronic Industries Association of Japan, Tokyo, Japan). The present apparatus is, however, adapted for storing computer data rather than digitized audio information.

Figure 1:
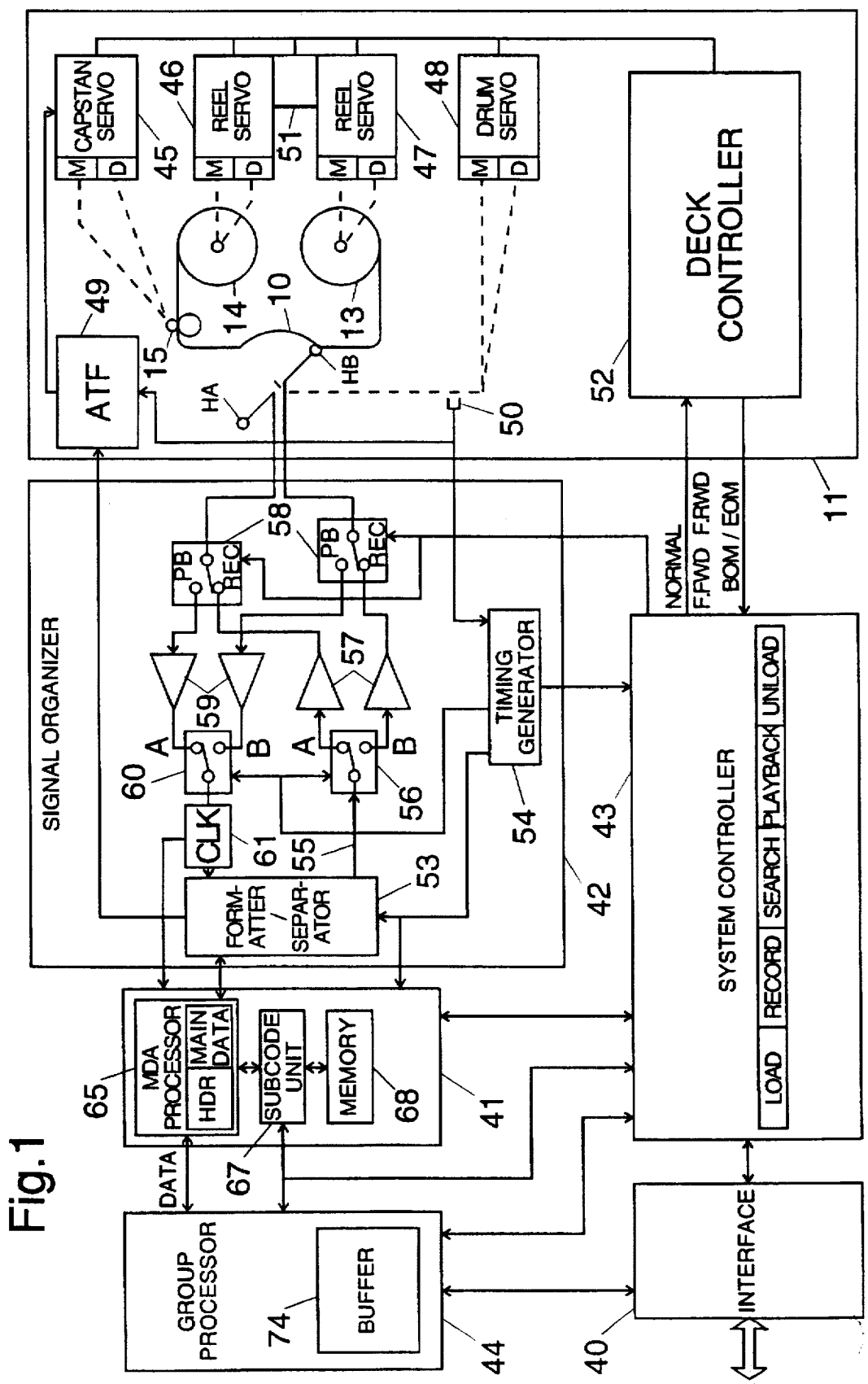
FIG. 1 is a block diagram of the main components of a data storage apparatus.

FIG. 1 is a block diagram of the data storage apparatus in its entirety. The apparatus includes a helical-scan tape deck 11 in which tape 10 passes at a predetermined angle across a rotary head drum (not shown) with a wrap angle of approximately 90°. In operation, the tape 10 is moved from a supply reel 13 to a take-up reel 14 by rotation of a capstan 15 against which the tape is pressed by a pinch roller; at the same time, the head drum is rotated. The head drum houses two read/write heads HA, HB angularly spaced by 180°. In known manner, these heads HA, HB are arranged to write overlapping oblique tracks across the tape 10. The track written by head HA has a positive azimuth while that written by head HB has a negative azimuth; each pair of positive and negative azimuth tracks constitutes a frame.

The tracks are used to store data provided to the apparatus (main data), together with items of auxiliary information known as sub codes which relate, for example, to the logical organization of the main data, its mapping onto the tape, certain recording parameters (such as format identity, tape parameters, etc.), and tape usage history. The tracks also contain synchronization bytes ('sync bytes') to enable data byte boundaries to be identified, and which are used to generate timing signals for controlling tape movement relative to the heads HA, HB. Pre-amble blocks included in the tracks contain timing data patterns to facilitate timing synchronization on playback. The format in which main data and auxiliary information are stored within the tracks forms no part of this invention, and accordingly need not be described here; more details of one possible format can be found, for example, in U.S. patent application Ser. No. 08/024,527, now U.S. Pat. No. 5,367,410 or European patent application Ser. No. 0 559 975.

In addition to the tape deck, the apparatus includes an interface unit 40 for interfacing the apparatus with a computer (not shown); a group processor 44 and a frame data processor 41 for processing main data and sub codes into and out of a Main Data Area fragment 27; a signal organizer 42 for composing/decomposing the signals for writing/reading a track and for appropriately switching the two heads HA, HB; and a system controller 43 for controlling the operation of the apparatus in response to commands received from a computer via the interface unit 40. Each of the main component units of the apparatus will be further described below.

The data storage apparatus is arranged to respond to commands from a computer to load/unload a tape, to store a data record and other logical segmentation marks, to search for a selected record using the segmentation marks, and to read back the next record.

The interface unit 40 is arranged to receive the commands from the computer and to manage the transfer of data records and logical data segmentation marks between the apparatus and computer. Upon receiving a command from the computer, the unit 40 passes it on to the system controller 43 which, in due course will send a response back to the computer via the unit 40 indicating compliance or otherwise with the original command. Once the apparatus has been set up by the system controller 43 in response to a command from the computer to store or read data, then the interface unit 40 will also control the passage of records and segmentation marks between the computer and the group processor 44.

During data storage the group processor 44 is arranged to segment the data provided to it in the form of data records into data packages each containing an amount of data corresponding to a fixed number (group) of frames (for example, twenty two), with an index which holds information regarding the logical segmentation of the data (record divisions, file marks) which is generated by the processor 44. The processor 44 also generates certain sub codes whose contents are group-dependent or concern the logical segmentation of data. To facilitate these tasks and the transfer of data to and from the processor 44, the latter is provided with a large buffer 74 which is arranged to hold several (for example, three) group's worth of data.

Once a group, including its index, has been assembled, it is transferred a frame at a time to the frame data processor 41. In order to speed the transfer of data between the processors 44 and 41, it is advantageous for the frame data processor 41 to be managed in terms of groups for receiving data from the processor 44—in other words, during recording, the processor 41 is told by the group processor 44 when a group is ready for processing after which the processor 41 accesses the frames of the group autonomously from the buffer 74.

When data are being read from tape, the group processor 44 is arranged to receive main data on a frame-by-frame basis, the data being written into the buffer 74 in such a manner as to build up a group. The group processor 44 can then access the group index to recover information on the logical organization (record structure, file marks) of the main data in the group. Using this information the group processor can pass the requested record or segmentation mark to the computer via the interface unit 40.

The frame data processor 41 functionally comprises a Main-Data-Area (MDA) processor 65 and a sub code unit 67 with an associated electronic memory 68 for tape usage data (in practice, these functional elements may be constituted by a single microprocessor running appropriate processes under program control).

The sub code unit 67 is arranged to provide sub codes to the processor 65 as required during recording and to receive and distribute sub codes from the processor 65 during playback. Dependent on their information contents, sub codes may be generated/required by the group processor 44 or the system controller. In the case of non-varying sub codes such as certain recording parameters, the sub codes may be permanently stored in the unit 67. Furthermore, frame-dependent sub codes may conveniently be generated by the sub code unit 67 itself.

The MDA processor 65 is arranged to process a frame's worth of main data at a time together with the associated sub codes. Thus during recording, the processor 65 receives a frame's worth of main data from the group processor 44 together with sub codes from the unit 67. On receiving the main data the processor 65 interleaves the data, and calculates error correcting codes and parity values, before assembling the resultant data and sub codes relating to the two tracks making up a frame. Before assembling the main data with the sub codes, scrambling (randomizing) of the data may be effected to ensure a consistent RF envelope independent of the data contents of a track signal.

During playback, the processor 65 effects a reverse process on the contents of the same frame. Unscrambled, error-corrected and de-interleaved main data are passed to the group processor 44 and sub codes are separated off and distributed by the unit 67 to the processor 44 or system controller 43 as required.

The signal organizer 42 comprises a formatter/separator unit 53 which during recording (data writing) is arranged to assemble the track contents provided by the frame data processor 41, to form the signal including sync bytes to be recorded on each successive track. The necessary pre-amble patterns are also inserted into the track signals where necessary by the unit 53. Timing signals for coordinating the operation of the unit 53 with rotation of the heads HA, HB are provided by a timing generator 54 fed with drum position signals output by a pulse generator 50 responsive to head drum rotation and located in the tape deck 11. The track signals output on line 55 from the unit 53 are passed alternately to head HA and head HB via a head switch 56, respective head drive amplifiers 57, record/playback switches 58 set to their record positions by the system controller 43 and a rotary transformer (not shown) which is incorporated in the rotary head drum and which provides contact-less connection to the heads HA and HB. The head switch 56 is operated by appropriate timed signals from the timing generator 54.

During playback (data reading) the track signals alternately generated by the heads HA and HB are fed via the rotary transformer, the record/playback switches 58 (now set by the system controller 43 to their playback positions), respective read amplifiers 59, a second head switch 60, and a clock recovery circuit 61, to the input of the formatter/ separator unit 53. The operation of the head switch 60 is controlled in the same manner as that of the head switch 56. The unit 53 now serves to generate signals indicating the timing of the predetermined regions (incorporating the sync bytes) in the track signals, to supply the timing signals to an automatic track following (ATF) circuit 49 in the tape deck 11, and to pass the track contents to the frame data processor 41. Clock signals are also passed to the processor 41 from the clock recovery circuit 61.

The tape deck 11 has four servos, namely a capstan servo 45 for controlling the rotation of the capstan 15, first and second reel servos 46, 47 for controlling rotation of the reels 13, 14 respectively, and a drum servo 48 for controlling the rotation of the head drum. Each servo includes a motor M and a rotation detector D both coupled to the element controlled by the servo. Associated with the reel servos 46, 47 is a detector 51 for sensing the ends of the tape: beginning-of-media (BOM) and end-of-media (EOM); this detector 51 may be based for example on motor current sensing, as the motor current of whichever reel is being driven to wind in tape (dependent on the direction of tape travel) will increase significantly upon stalling of the motor at BOM/EOM.

The operation of the tape deck 11 is controlled by a deck controller 52 which is connected to the servos 45 to 48 and to the BOM/EOM detector 51. The controller 52 is operable to cause the servos to advance the tape, (either at normal speed or at high speed) through any required distance. This control is effected either by energizing the servos for a time interval appropriate to the tape speed set, or by feedback of tape displacement information from one or more of the rotation detectors D associated with the servos.

The deck controller 52 is itself governed by control signals issued by the system controller 43. The deck controller 52 is arranged to output to the controller 43 signals indicative of BOM and EOM being reached.

The system controller 43 serves both to manage high-level interaction between the computer and storage apparatus and to coordinate the functioning of the other units of the storage apparatus in carrying out the basic operations of Load-Record-Search-Playback-Unload requested by the computer. In this latter respect, the controller 43 serves to coordinate the operation of the deck 11 with the data processing portion of the apparatus.

In controlling the tape deck 11, the system controller can request the deck controller 52 to move the tape at the normal read/write speed (Normal) or to move the tape forwards or backwards at high speed, that is, Fast Forward (F.FWD) or Fast Rewind (F.RWD).

During processing in the circuitry shown in FIG. 1 binary digital data are manipulated in a level-encoded form (also known as non-return to zero, or NRZ); thus a binary digit 1 is represented by one signal level, and a binary digit 0 is represented by another signal level. However, prior to actual writing to tape, these data are converted to a transition-encoded form (non-return to zero with inversion, or NRZI), in which a binary digit 1 is represented by a transition from one signal level to another (on tape, a transition from magnetization in one sense to magnetization in the opposite sense), and a binary digit 0 is represented by an absence of such a transition.

For playback of data from tape it is necessary to process the signals induced in the read/write heads HA, HB by the magnetization patterns on the tape, in order to recover a clock signal synchronized to the occurrence of NRZI-encoded data represented by these patterns, for use in recovering the NRZI-encoded data bits themselves. These NRZI-encoded data are then converted to NRZ data for subsequent manipulation as already described above.

Figure 2:
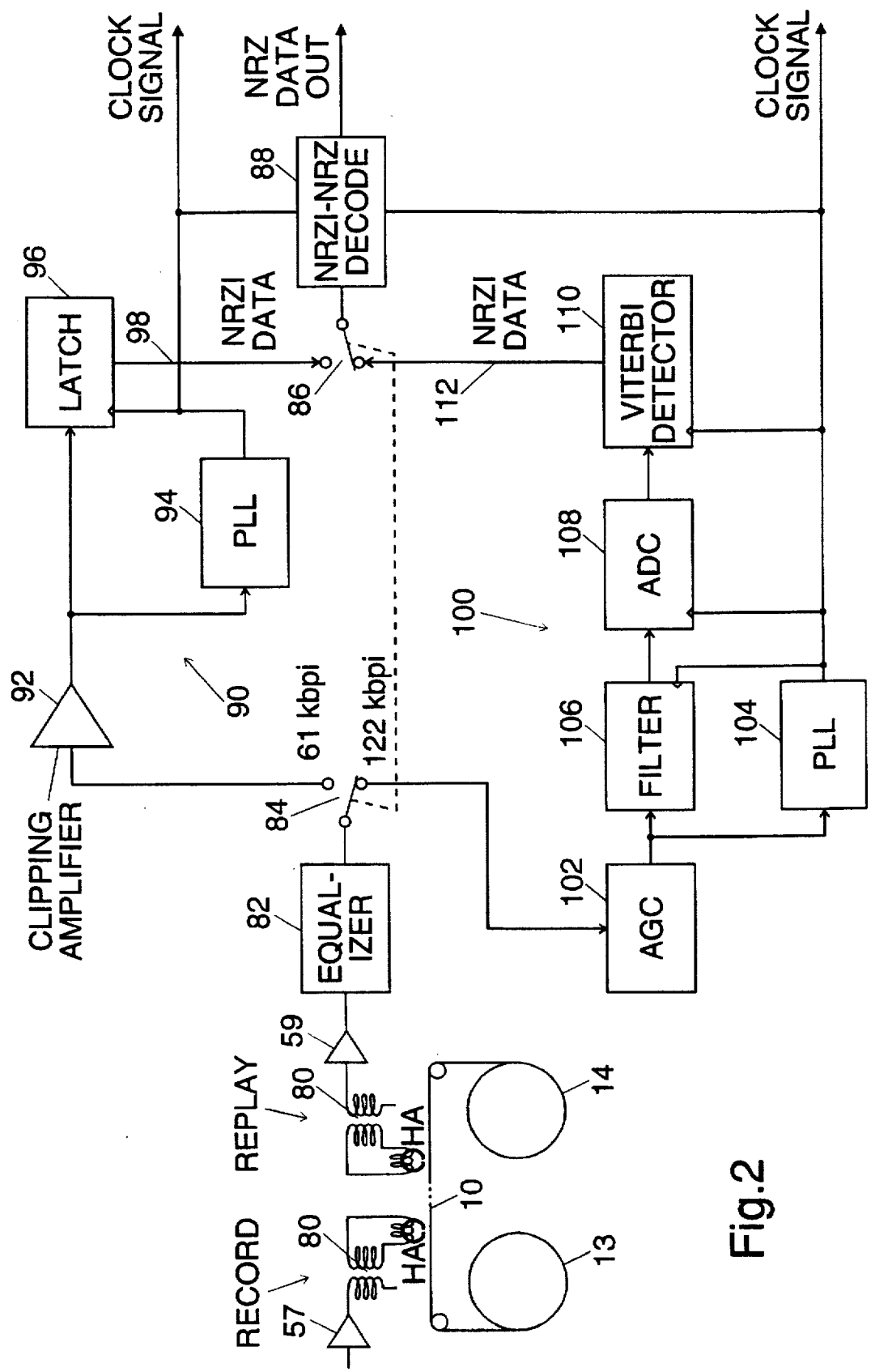
FIG. 2 is a block diagram of signal detection and decoding circuitry forming part of the apparatus of FIG. 1.

FIG. 2 shows in more detail the circuitry for clock recovery (as in the clock recovery circuit 61) and for recovering NRZI-encoded data (in the clock recovery circuit 61 or the formatter/separator 53). Referring to FIG. 2, a record operation is represented schematically by the read/ write head HA and rotary transformer 80, with a connection to the associated head drive amplifier 57. A subsequent playback operation is likewise indicated schematically by the read/write head HA and the rotary transformer 80, with a connection to the associated read amplifier 59. It is emphasized that this representation is only schematic: in practice at any given moment the read/write head is either recording or playing back data, but not both.

The output signal from the read amplifier 59 is supplied to an equalizer 82, which shapes the frequency response of the overall signal processing channel for operation with a 61 kbpi signal to be approximately raised cosine with a bandwidth of about 0.75 times the bit frequency. The output of this equalizer is passed to a switch 84 which selects one of two clock recovery and data decoding paths 90 and 100, depending on whether the bit density of the recorded signal is 61 kbpi or 122 kbpi respectively. The signal output by the equalizer 82 has in principle two levels, 0 and 1, at 61 kbpi (a binary signal), and in principle three levels,+1, 0 and -1, at 122 kbpi (a ternary signal).

The 61 kbpi path 90 comprises a clipping amplifier 92, a phase-locked loop (PLL) 94 and a latch 96. The clipping amplifier 92 ensures that the level of the signal received from the equalizer 82 attains either of two levels between transitions, and a clock signal is recovered from these transitions by the PLL 94. This clock signal controls the latch 96 to sample the signal from the clipping amplifier 92 to produce a NRZI-encoded data stream on a line 98. The clock signal is also supplied to the processor 41.

The NRZI-encoded data stream on the line 98 is supplied via a switch 86, corresponding to the switch 84, to a NRZI-to-NRZ decoder 88 which supplies a binary 1 digit when the current and previous NRZI data are different, or a binary 0 digit when they are the same.

The 122 kbpi path 100 comprises an automatic gain control (AGC) circuit 102, which establishes and stabilizes the +1 and -1 amplitudes of the signal received from the equalizer 82. The signal from the AGC circuit 102 is supplied to a PLL 104 for recovery of a clock signal, and is also passed to a filter 106 which further shapes the overall channel frequency response for operation with a 122 kbpi signal to match the cosine characteristic of an ideal PR-1 partial response channel. The filtered signal is input to an analogue-to-digital converter (ADC) 108, which produces a digitized version of the filtered signal, for supply to a Viterbi detector 110. The clock signal from the PLL 104 is provided to the filter 106, ADC 108 and Viterbi detector 110, as well as to the processor 41. If desired the PLL 104 may comprise the same physical circuitry as the PLL 94 in the 61 kbpi path 90, with appropriate switching of the characteristics of the phase detector to modify the operation of the PLL as required.

The output of the Viterbi detector 110 is an NRZI-encoded data stream on a line 112, which is supplied via the switch 86 to the NRZI-to-NRZ decoder 88.

Figure 3:
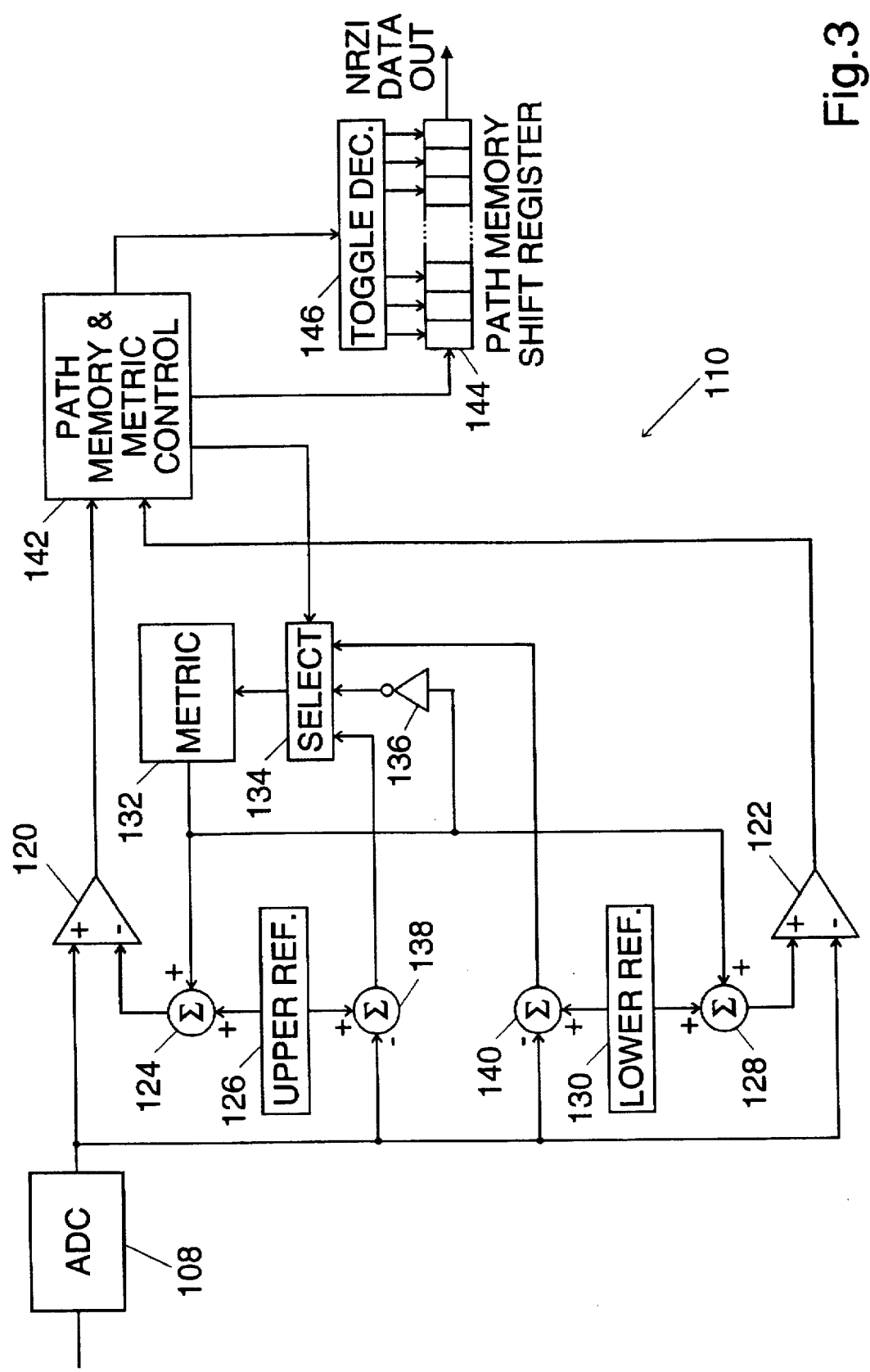
FIG. 3 is a block diagram of a Viterbi detector forming part of the circuitry of FIG. 2.

The Viterbi detector 110 is arranged to implement PR-1 (duobinary) PRML decoding, and is shown in more detail in FIG. 3. Referring to FIG. 3, the digitized output signal from the ADC 108 is supplied to the + input of a comparator 120 and to the − input of another comparator 122. The − input of the comparator 120 receives a threshold signal from a summer 124, which in turn receives a reference signal from an upper reference source 126. In similar manner, the + input of the comparator 122 receives a threshold signal from a summer 128, which in turn receives a reference signal from a lower reference source 130. The summers 124 and 128 derive their respective threshold signals as the sum of the signal from the respective reference source 126 or 130, plus a signal from a metric circuit 132.

The metric circuit 132 is controlled by a select circuit 134 in accordance with the values of four signals: the output of the metric circuit 132 itself, after inversion by an inverter 136; the output of a difference circuit 138, which represents the difference between the reference signal from the upper reference source 126 and the signal from the ADC 108; the output of a difference circuit 140, which represents the difference between the reference signal from the lower reference source 130 and the signal from the ADC 108; and a control signal from a path memory and metric control circuit 142.

The path memory and metric control circuit 142 receives the outputs from the comparators 120 and 122, and supplies an output signal to a path memory shift register 144 and a control signal to a toggle decoder 146, in addition to the control signal for the select circuit 134. The toggle decoder 146 inverts selected bits in the path memory shift register 144, according to the control signal supplied by the control circuit 142. The output from the shift register 144 comprises the NRZI-encoded data stream which is supplied via the switch 86 to the NRZI-to-NRZ decoder 88 (FIG. 2).

The Viterbi detector 110 operates to compare incoming digitized signals from the ADC 108 with two threshold signals, in the comparators 120 and 122, to determine whether the digitized signals are above the upper threshold, below the lower threshold, or between the two thresholds. These threshold signals are adjusted in an adaptive manner in accordance with the current input signal values and the preceding decoded signals represented by the changing metric, to decode the incoming signal in accordance with the maximum likelihood decoded value which that signal may represent.

The metric circuit 132 stores an adjustment to the comparator thresholds for the next NRZI bit, based on what the most likely value of the current bit is. The select circuit 134 chooses one of three possible metrics to store in the circuit 132, depending on the value of the current bit. The path memory shift register 144 holds n previous NRZI bits (e.g. twenty of them), so that in cases where a sequence of several (e.g. m) successive ternary zero levels are received, the detector can wait until receipt of a ternary +1 or −1 level, before making a final decision on the NRZI values which most likely correspond to those ternary zero levels, as predicted by the maximum likelihood decoding principle. At the beginning of the series of ternary zeroes, the detector might select temporarily a less likely NRZI value. All subsequent NRZI values are then less likely; at the next ternary +1 or −1 level, the detector discovers this and toggles the previous m NRZI values in the path memory. The length n of the path memory shift register 144 is chosen to be greater than the maximum expected sequence length m.

The circuits shown in FIGS. 2 and 3 enable a single DDS mechanism to read and write DDS tapes at a bit density of either 61 kbpi or 122 kbpi, without excessive and costly duplication of circuitry and components for operation at each bit density. In particular, a single rotary head drum, having a magnetic gap length of approximately 0.33 μm can be used for operation at both bit densities. This advantageous arrangement is possible in part because of the choice of PR-1 PRML decoding; this has an overall channel frequency response of $$H(f) = 2 \cos(\pi f/f_b)$$

where f is frequency and $f_b$ is the bit frequency. This frequency response is well-suited to use of a head with a gap length of approximately 0.33 μm for playback of data recorded at 122 kbpi (equivalent to a recorded wavelength—two bit cells—of 0.33 µm). The magnetic characteristics of the head and media can be adjusted to bring their combined response closer to the desirable H(f) function. Thus, increasing the coercivity of the recording media, or reducing its particle size, increases the high frequency (or short wavelength) output. Shortening the read head gap length, or using a head core material of greater permeability at high frequencies, likewise increases the high frequency output.

For reading data at 122 kbpi it is desirable to ensure that the input signal to the Viterbi detector has an adequate signal-to-noise ratio. This can be accomplished, for example, by using a short magnetic head gap depth (5–10 µm), by using a thicker core to provide a higher efficiency, and by using media with a smoother surface and/or a higher coercivity (in addition to its possible use to match the frequency response H(f) as noted above).

As noted above, the overall channel for operation at a bit density of 61 kbpi has a raised cosine frequency response, which has a cut-off frequency at 0.75 $f_b$. The PR-1 frequency response H(f), used for operation at a bit density of 122 kbpi, has a cut-off frequency at 0.5 $f_b$. Although these two responses cannot both be matched exactly in a single circuit, the divergence of the response of a single circuit from each ideal response can be adjusted to provide an optimum compromise between them, by appropriate selection of bit frequency for operation at each bit density, having regard to the recorded wavelength, the choice of tape speed relative to the read/write heads, and characteristics and parameters of the circuit technology to be used in implementing the required circuit functions.

Correct matching to the low-frequency portion of the response H(f) is achieved by use of a d.c.-free and low-frequency-attenuating modulation scheme for scrambling/randomizing data prior to recording. This modulation scheme is also chosen to have no components in the frequency spectrum at the cut-off frequency of the response H(f), e.g. by avoiding encodings comprising all (NRZ) binary one digits.

We claim:

1. A method for retrieving data from a magnetic medium, said data being stored at a first or a second bit density on said medium, said second density being higher than said first density, comprising the steps of:

deriving signals corresponding to magnetic field patterns stored on the magnetic medium, by means of a gapped magnetic head, said head being used to derive signals for data stored at either said first or said second density;

decoding said signals using a first decoder for data stored at said first density, to retrieve data represented by said signals;

decoding said signals using a second decoder for data stored at said second density, to retrieve data represented by said signals, said second decoder incorporating a PR-1 partial-response maximum-likelihood decoding operation; and selecting said first or said second decoder for use in accordance with the bit density of data stored on said medium.

2. The method of claim 1, wherein said signals are derived using read heads mounted on a rotary drum.

3. The method of claim 2, wherein said signals are transferred from said heads through a rotary transformer.

4. The method of claim 1, wherein said signals are equalized prior to decoding, a single equalization circuit being used irrespective of the bit density of data being retrieved.

5. The method of claim 1, wherein said magnetic head has a gap with a magnetic gap length of approximately 0.33 µm, said gap being used for data stored at either said first or said second density.

6. The method of claim 1, wherein said second bit density is twice said first bit density.

7. The method of claim 6, wherein said first bit density is approximately 61 kbpi and said second bit density is approximately 122 kbpi.

8. Apparatus for retrieving data from a magnetic medium, said data being stored at a first or a second bit density on said medium, said second density being higher than said first density, comprising:

means including a gapped magnetic head for deriving signals corresponding to magnetic field patterns stored on the magnetic medium, said head being used to derive signals for data stored at either said first or said second density;

a first decoder for decoding said signals for data stored at said first density, to retrieve data represented by said signals;

a second decoder for decoding said signals for data stored at said second density, to retrieve data represented by said signals, said second decoder incorporating a PR-1 partial-response maximum-likelihood decoding operation; and means for selecting said first or said second decoder for use in accordance with the bit density of data stored on said medium.

* * * * *